(12) United States Patent
Sun et al.

(10) Patent No.: US 11,932,564 B2
(45) Date of Patent: Mar. 19, 2024

(54) SYSTEM AND METHOD FOR EXTRACTING CARBON SOURCE FROM SEWAGE SLUDGE IN SEWER PIPES THROUGH ONLINE ORGANIC AND INORGANIC COMPONENT SEPARATION

(71) Applicant: NORTH CHINA MUNICIPAL ENGINEERING DESIGN & RESEARCH INSTITUTE CO., LTD., Tianjin (CN)

(72) Inventors: Yongli Sun, Tianjin (CN); Xingcan Zheng, Tianjin (CN); Pengfeng Li, Tianjin (CN); Min Yang, Tianjin (CN); Kejian Sui, Tianjin (CN)

(73) Assignee: NORTH CHINA MUNICIPAL ENGINEERING DESIGN & RESEARCH INSTITUTE CO., LTD, Tianjin (CN)

( * ) Notice: Subject to any disclaimer, the term of this patent is extended or adjusted under 35 U.S.C. 154(b) by 0 days.

(21) Appl. No.: 18/038,019

(22) PCT Filed: Aug. 8, 2022

(86) PCT No.: PCT/CN2022/110744
§ 371 (c)(1),
(2) Date: Sep. 7, 2023

(87) PCT Pub. No.: WO2023/240774
PCT Pub. Date: Dec. 21, 2023

(65) Prior Publication Data
US 2024/0034661 A1    Feb. 1, 2024

(30) Foreign Application Priority Data

Jun. 16, 2022   (CN) .................. 202210679047.X

(51) Int. Cl.
*C02F 11/127*   (2019.01)
*C02F 11/122*   (2019.01)

(52) U.S. Cl.
CPC .......... *C02F 11/127* (2013.01); *C02F 11/122* (2013.01); *C02F 2201/005* (2013.01); *C02F 2303/02* (2013.01); *C02F 2303/24* (2013.01)

(58) Field of Classification Search
None
See application file for complete search history.

(56) References Cited

FOREIGN PATENT DOCUMENTS

| CN | 202898174 U | 4/2013 |
|---|---|---|
| CN | 103288313 A | 9/2013 |

(Continued)

*Primary Examiner* — Peter Keyworth
(74) *Attorney, Agent, or Firm* — Bayramoglu Law Offices LLC

(57) ABSTRACT

A system for extracting carbon source from sewage sludge in sewer pipes through online organic and inorganic component separation includes an outer system box, where the outer system box is provided therein with a system body; the system body includes a deodorization module, a pre-treatment module, and a cyclone separation module that are sequentially connected from top to bottom; an upper side wall of the cyclone separation module is provided with an oversize residue pressing module; and the pre-treatment module, the cyclone separation module, and the oversize residue pressing module are electrically connected to a control module. The present disclosure achieves online and on-site quick treatment of the sewage sludge in the sewer pipe, and solves common practical problems arising in the existing centralized treatment and disposal method of sewage sludge in the sewer pipe.

10 Claims, 2 Drawing Sheets

(56) References Cited

FOREIGN PATENT DOCUMENTS

| | | |
|---|---|---|
| CN | 103526792 A | 1/2014 |
| CN | 106830609 A | 6/2017 |
| CN | 207562469 U | 7/2018 |
| CN | 111732300 A | 10/2020 |
| CN | 213202764 U | 5/2021 |
| CN | 213433731 U | 6/2021 |
| CN | 215049613 U | 12/2021 |
| CN | 215516967 U | 1/2022 |
| CN | 114751616 A | 7/2022 |
| JP | 2015024371 A | 2/2015 |
| WO | 2022057120 A1 | 3/2022 |

SYSTEM AND METHOD FOR EXTRACTING CARBON SOURCE FROM SEWAGE SLUDGE IN SEWER PIPES THROUGH ONLINE ORGANIC AND INORGANIC COMPONENT SEPARATION

CROSS REFERENCE TO THE RELATED APPLICATIONS

This application is the national phase entry of International Application No. PCT/CN2022/110744, filed on Aug. 8, 2022, which is based upon and claims priority to Chinese Patent Application No. 202210679047.X, filed on Jun. 16, 2022, the entire contents of which are incorporated herein by reference.

TECHNICAL FIELD

The present disclosure belongs to the technical field of sewerage, and specifically relates to a system and method for extracting carbon source from sewage sludge in sewer pipes through online organic and inorganic component separation.

BACKGROUND

Unlike those in developed countries in Europe and America, urban sewer pipes in China generally have problems such as a high water level and a low flow rate in actual operation, leading to the deposition of a large amount of granular organic matter of the sewage in the sewer line. In China, the depth of sludge deposited in some pipe sections even reaches 50% of the pipe diameter, which is the main reason for the low centralized collection rate of urban domestic sewage. According to 2020 statistics, in China, the centralized sewage collection rate averaged 64%, and it was even as low as 20-30% in many cities. The deposited sludge in the sewer pipe will affect the sewage collection efficacy, and also generates a large amount of greenhouse gases such as $CH_4$ through anaerobic reactions Further, the deposited sludge may become a significant pollution source of urban water bodies in case of heavy rain.

The existing treatment and disposal method for sewage sludge in urban sewer pipes mainly has the following problems. (1) The sewage sludge is disposed of by incineration or landfilling. However, this disposal method does not achieve resource utilization of organic matter in the sewage sludge, and it will generate greenhouse gases such as $CO_2$ and $CH_4$. (2) The sewage sludge is collectively treated. However, the sewage sludge has a large transportation volume and a high transportation cost, and is prone to leak during transportation, thereby causing non-point source pollution. In addition, the centralized sludge treatment station faces difficulties in the selection of the construction site and sludge disposal.

Therefore, there is an urgent need for a system and method for extracting carbon source from sewage sludge in sewer pipes through online organic and inorganic component separation. The system and method have important practical significance for innovating in the treatment and disposal method of sewage sludge in urban sewer pipes, improving the centralized collection rate of sewage, reducing the carbon emissions from the sewer system, and assisting the green, low-carbon, and high-quality development of China's sewerage industry.

SUMMARY

In order to overcome the shortcomings of the prior art, an objective of the present disclosure is to provide a system and method for extracting carbon source from sewage sludge in sewer pipes through online organic and inorganic component separation. The present disclosure utilizes the system for extracting carbon source from sewage sludge in sewer pipes through online organic and inorganic component separation to achieve online and on-site quick treatment of the sewage sludge. The present disclosure solves the common practical problems of existing centralized sludge treatment and disposal method, for example, the generation of greenhouse gases such as $CO_2$ and $CH_4$, large sludge transportation volume, easy leakage of sewage sludge during transportation to cause non-point source pollution, and difficulties in selecting a construction site for a centralized sludge treatment station, etc.

To achieve the above objective, embodiments of the present disclosure adopt the following technical solutions.

In a first aspect, an embodiment of the present disclosure provides a system for extracting carbon source from sewage sludge in sewer pipes through online organic and inorganic component separation. The system includes an outer system box, where the outer system box is provided therein with a system body; the system body includes a deodorization module, a pre-treatment module, and a cyclone separation module that are sequentially connected from top to bottom; an upper side wall of the cyclone separation module is provided with an oversize residue pressing module; and the pre-treatment module, the cyclone separation module, and the oversize residue pressing module are electrically connected to a control module;

the pre-treatment module is configured to screen out large particles in sewage sludge, and includes a grid plate, a rotating scraper, a rinsing device, a variable-frequency drive motor, a sludge distribution pipe, an oversize residue inlet slot, a flow adjustment sludge funnel, a sludge discharge valve, and a first sludge outlet pipe;

the grid plate is a fixed, horizontal circular grid plate;

the sludge distribution pipe is provided with a sludge outlet; and the sludge outlet is located above the grid plate;

a bottom of the rotating scraper is tangent to an upper surface of the grid plate; and the rotating scraper is driven by the variable-frequency drive motor to distribute the sewage sludge discharged from the sludge distribution pipe on a surface of the grid plate.

the rinsing device is mainly configured for intermittent rinsing of the large particle intercepted on the surface of the grid plate and for cleaning after a system operation; and the rinsing device is fixedly connected to the rotating scraper, and is provided with an inlet end connected to a water inlet system through a hose;

the oversize residue inlet slot is provided opposite to the sludge distribution pipe, and close to an edge of the grid plate, so that the rotating scraper is easy to scrape the large particle intercepted by the grid plate into the oversize residue inlet slot;

the flow adjustment sludge funnel is located below the grid plate, and is configured to collect sludge passing through the grid plate and adjust a sludge flow rate; and the collected sludge enters the cyclone separation module through the first sludge outlet pipe;

the cyclone separation module is configured to perform organic and inorganic component separation and carbon source extraction of the sewage sludge under a high-speed cyclone state, and includes a variable-frequency stirring motor, an adjustable stirring paddle, a sludge inlet pipe, a dosing system, a separation funnel, a second sludge outlet pipe, a discharge valve, an inorganic component discharge pipe, an emptying pipe, and an emptying valve;

the variable-frequency stirring motor is configured to drive the adjustable stirring paddle to rotate; and the adjustable stirring paddle is provided in a middle-upper part of the cyclone separation module;

the sludge inlet pipe is provided vertically and opposite to the second sludge outlet pipe; and the sludge inlet pipe includes an inlet end connected to the dosing system and the first sludge outlet pipe through a tee, and an outlet end provided 15-20 cm below an operating liquid level of the cyclone separation module;

the separation funnel is located at a bottom of the cyclone separation module, and is configured to collect an inorganic component separated from the sewage sludge; and a lower end of the separation funnel is provided with the discharge valve and the inorganic component discharge pipe;

the emptying pipe is provided in a middle part of the cyclone separation module, and is configured to empty the sewage sludge in a main body of the cyclone separation module after the system operation;

the oversize residue pressing module is configured to dewater and press the oversize residue separated by the grid plate, and includes a drive motor, a pressing tank, and a discharge spout; the pressing tank is connected to the oversize residue inlet slot through a vertical channel; and the discharge spout is provided diagonally upwards, and extends out of a side of the outer system box; and the deodorization module is configured for unpowered deodorization, that is, physical adsorption of malodorous gas emitted during sludge treatment, and includes a filler and an air evacuation device; a bottom surface of the deodorization module is provided with an air inlet mesh; the filler includes granular activated carbon; and the air evacuation device includes one end connected to a top center of the deodorization module and the other end extending out of the side of the outer system box.

the rotating scraper has a height of 4 cm and a length equivalent to a radius of the grid plate; the rotating scraper is made of a hard material and an elastic rubber material; the elastic rubber material is provided at a lower part of a free end of the rotating scraper; and the elastic rubber material has a length that is ⅓ of the length of the rotating scraper, and a height that is ½ of a height of the rotating scraper.

the rinsing device is provided with a rinsing nozzle every 10-20 cm; the rinsing nozzle is provided diagonally downwards at 45° from a vertical direction; and the rinsing nozzle is located above the rotating scraper; and the oversize residue inlet slot has a length that is ⅓ of the radius of the grid plate, a width of 100-120 mm, and a height of 120-150 mm; and a top of the oversize residue inlet slot is 2 cm higher than the upper surface of the grid plate to prevent the sewage sludge from entering.

Further, a bottom of the outer system box is provided with a caster, allowing flexible movement of the system at an online sludge separation site of a sewer pipe network.

Further, a sludge inlet of the sludge distribution pipe is connected to a pressure sludge outlet pipe; the pressure sludge outlet pipe is connected to a suction pump of a sewer pipe network sludge cleaning vehicle; and the suction pump is connected to a bottom of a blocked sewage inspection well at a tail end of a dredging section of a sewer pipe network through a suction pipe.

Further, the second sludge outlet pipe of the cyclone separation module is connected to a sewage inspection well of a nearby sewer pipe network through a sludge discharge pipe.

Further, the separation funnel of the cyclone separation module is made of 10-12 cm thick organic glass, easy for observing an actual volume of the inorganic component in the form of fine sand and ultra-fine sand separated during the sludge treatment; an outer wall of the system body and the outer system box are made of a stainless steel material; and the system body has a diameter of 60-80 cm.

Further, the control module is located on a front side of the outer system box, and is electrically connected, through a circuit, with the variable-frequency drive motor of the pre-treatment module, the drive motor of the oversize residue pressing module, and the variable-frequency stirring motor, the discharge valve, and the emptying valve of the cyclone separation module; the emptying valve is provided on the emptying pipe; and the control module is powered by a public power distribution cabinet close to a dredging section of a sewer pipe or an on-board diesel generator at a dredging site.

In a second aspect, an embodiment of the present disclosure provides a method for extracting carbon source from sewage sludge in sewer pipes through online organic and inorganic component separation. The method uses the system for extracting carbon source from sewage sludge in sewer pipes through online organic and inorganic component separation, and includes the following steps:

a: pumping, by the suction pump of the sewer pipe network sludge cleaning vehicle, the sewage sludge in the sewer pipe network into the sludge distribution pipe of the pre-treatment module through the suction pipe and the pressure sludge outlet pipe; distributing, by the rotating scraper under continuous rotation, the sewage sludge discharged from the sludge distribution pipe on the upper surface of the grid plate, such that most of the sewage sludge quickly passes through circular holes of the grid plate due to gravity and enters the flow adjustment sludge funnel below the grid plate, while the large particle in the sewage sludge is intercepted on the upper surface of the grid plate; rinsing the large particle through a high-pressure water flow sprayed by the rinsing nozzle of the intermittently running rinsing device; allowing the rinsed large particle to enter from the oversize residue inlet slot into the pressing tank of the oversize residue pressing module through the vertical channel for dewatering and pressing; and collecting, by a dedicated collection bucket, the oversize residue discharged from the discharge spout as household waste, and transporting the oversize residue to a nearby garbage transfer station;

b: allowing the sewage sludge pre-treated by the pre-treatment module in step a to flow through the first sludge outlet pipe, and enter vertically into the main body of the cyclone separation module through the sludge inlet pipe, along with an agent added by the dosing system; subjecting, by the adjustable stirring paddle under high-speed rotation driven by the variable-frequency stirring motor, the sewage sludge to a hydrocyclone separation with a hydraulic retention time of 1-3 min, such that an organic component, namely an organic carbon source, wrapped and adsorbed on a surface of a substance such as fine sand in the sewage sludge is separated into a liquid phase, a low-density sludge mixture dominated by an organic component enters the middle-upper part of the cyclone separation module, and an inorganic inert component such as fine sand and ultra-fine sand in the sewage sludge enters the separation funnel under a combined action of a centrifugal force and gravity; and determining whether to operate the dosing system based on an actual phosphate concentration in the sewage sludge and a phosphorus resource utilization need;

c: discharging the sewage sludge treated by the cyclone separation module in step b into the sewage inspection well of the nearby sewer pipe network through the second sludge outlet pipe and the sludge discharge pipe, and locating an outlet of sludge discharge pipe below a water level of the sewage inspection well to avoid ineffective loss of the carbon source extracted from the sewage sludge due to waterfall aeration; and intermittently discharging, according to an actual volume, the inorganic inert component separated in step b into a dedicated collection bucket through the inorganic component discharge pipe under the control of the emptying valve and the discharge valve, and transporting the inorganic inert component to a nearby urban sewage treatment plant for further sand-water separation and precipitation separation of phosphorus-containing chemical sludge; and d: allowing the malodorous gas such as hydrogen sulfide emitted during the treatment in steps a and b to naturally enter the deodorization module provided in an upper part of the system; subjecting the malodorous gas to physical adsorption treatment of the filler; and discharging the malodorous gas from the air evacuation device connected to the top center of the cylindrical deodorization module.

Further, the volatile suspended solids/suspended solids (VSS/SS) ratio and the chemical oxygen demand/total nitrogen (COD/TN) ratio of the sewage sludge treated by the cyclone separation module are not less than 0.5 and 15, respectively, indicating that the sewage sludge is able to be utilized as a supplementary carbon source for an urban sewage treatment plant with a high emission standard at the tail end of the sewer pipe network; and the VSS/SS ratio of the inorganic inert component such as fine sand separated by the cyclone separation module is less than 3%, indicating that the inorganic inert component is able to be utilized as the engineering construction material.

The technical solutions in the embodiments of the present disclosure have the following beneficial effects:

1. In the present disclosure, the system for extracting carbon source from sewage sludge in sewer pipes through online organic and inorganic component separation is directly connected to the sludge outlet of the suction pump of the sewer pipe network sludge cleaning vehicle. The present disclosure achieves online and on-site quick treatment of the sewage sludge in the sewer pipe, achieving separation of the inorganic component and the extraction of the carbon source. The present disclosure solves the common practical problems in the existing centralized treatment and disposal method of sewage sludge in the sewer pipe. These problems include: low utilization of organic matter in the sewage sludge, generation of greenhouse gases such as $CO_2$ and $CH_4$, large sludge transportation volume, easy leakage of the sewage sludge during transportation to cause non-point source pollution, and difficulties in the selection of the construction site and sludge disposal of the centralized sludge treatment station, etc.

2. Compared with the existing centralized treatment and disposal method of sewage sludge, the present disclosure integrates the process units to achieve online and on-site sludge treatment, and achieves high sludge utilization, high centralized collection rate of urban domestic sewage, low carbon emissions from the sewer system, and low cost of the carbon source added for the urban sewage plant.

3. In the present disclosure, the circular fixed grid plate does not require the motor drive and remains in a horizontal static state during the pre-treatment process of the sewage sludge. The circular fixed grid plate achieves continuous normal filtration through the rotation of the rotating scraper instead of high-pressure water flushing, with an effective filtration area ratio of over 95%. Therefore, the circular fixed grid plate significantly improves the effective filtration area (generally less than 25% in case of a traditional grid) and filtration flux.

4. The present disclosure features high pertinence, practicality, and operability, and provides a new model for sewage sludge treatment, having important practical significance in assisting the green, low-carbon, and high-quality development of China's sewerage industry.

Figure 1:
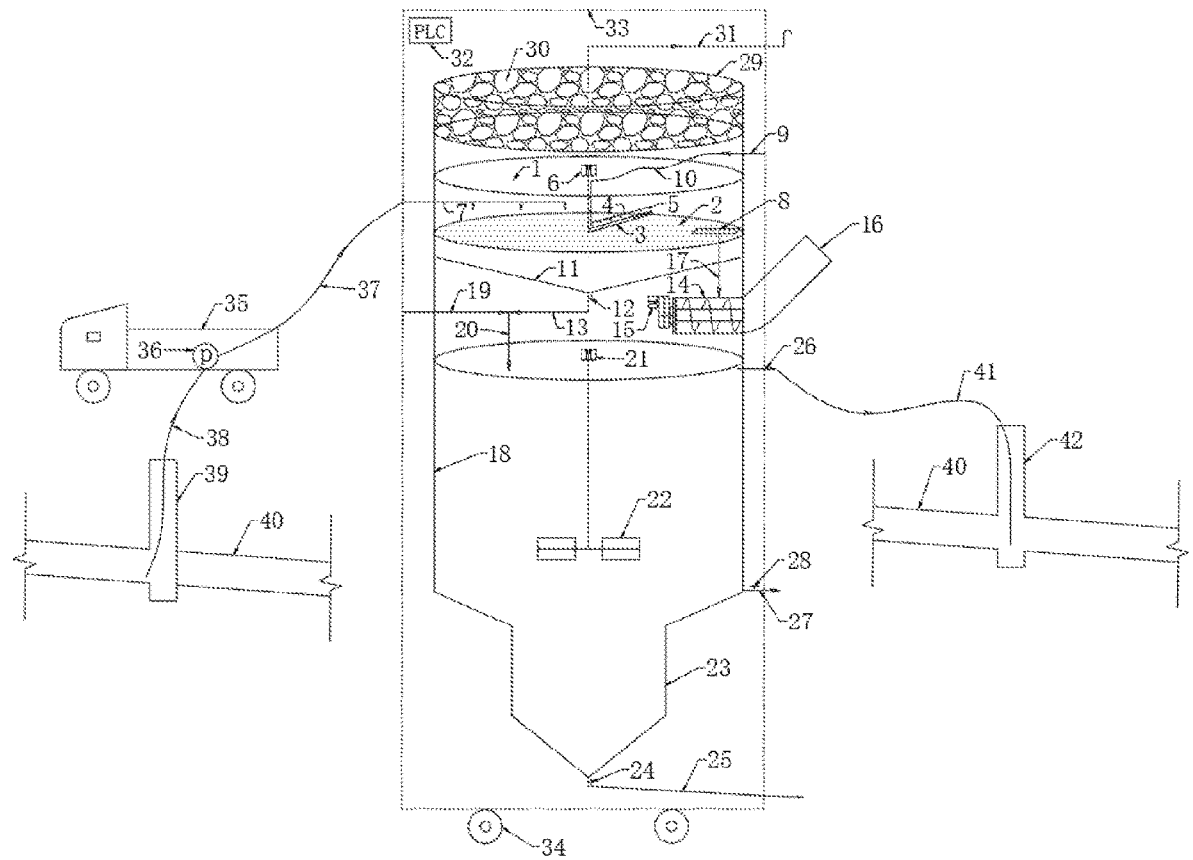
FIG. 1 is a structural diagram of a system for extracting carbon source from sewage sludge in sewer pipes through online organic and inorganic component separation according to an embodiment of the present disclosure.

Reference Numerals: 1. pre-treatment module; 2. grid plate; 3. rotating scraper; 4. rinsing device; 5. rinsing nozzle; 6. variable-frequency drive motor; 7. sludge distribution pipe; 8. oversize residue inlet slot; 9. water inlet system; 10. hose; 11. flow adjustment sludge funnel; 12. sludge discharge valve; 13. first sludge outlet pipe; 14. oversize residue pressing module; 15. drive motor; 16. discharge spout; 17. vertical channel; 18. cyclone separation module; 19. dosing system; 20. sludge inlet pipe; 21. variable-frequency stirring motor; 22. adjustable stirring paddle; 23. separation funnel; 24. discharge valve; 25. inorganic component discharge pipe; 26. second sludge outlet pipe; 27. emptying pipe; 28. emptying valve; 29. deodorization module; 30. filler; 31. air evacuation device; 32. control module; 33. outer system box; 34. caster; 35. sewer pipe network sludge cleaning vehicle; 36. suction pump; 37. pressure sludge outlet pipe; 38. suction pipe; 39. blocked sewage inspection well; 40. sewer pipe network; 41. sludge discharge pipe; and 42. sewage inspection well.

DETAILED DESCRIPTION OF THE EMBODIMENTS

Figure 2:
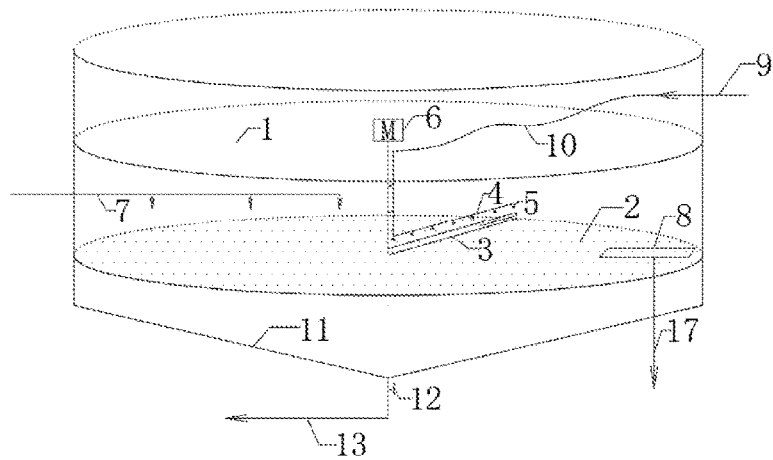
FIG. 2 is a structural diagram of a pre-treatment module of the system shown in FIG. 1.
Figure 3:
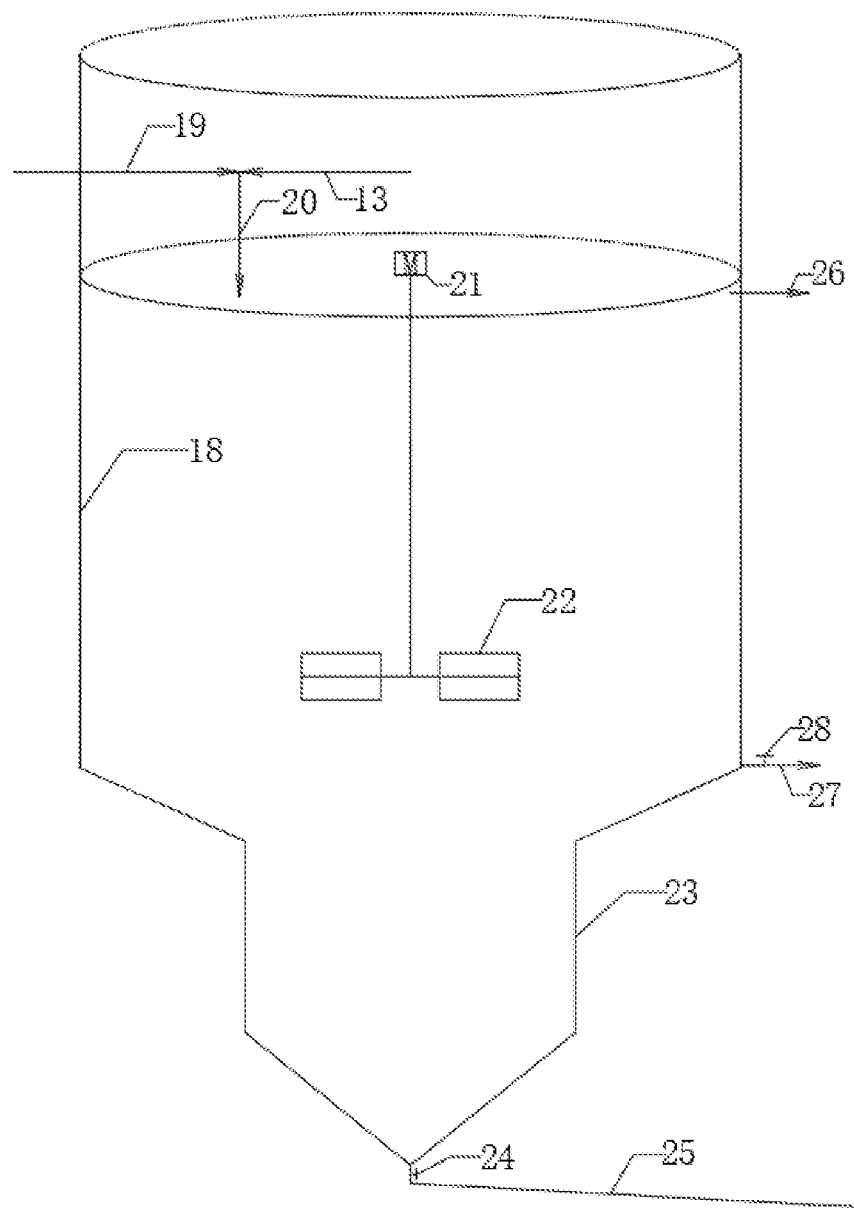
FIG. 3 is a structural diagram of a cyclone separation module of the system shown in FIG. 1.
Figure 4:
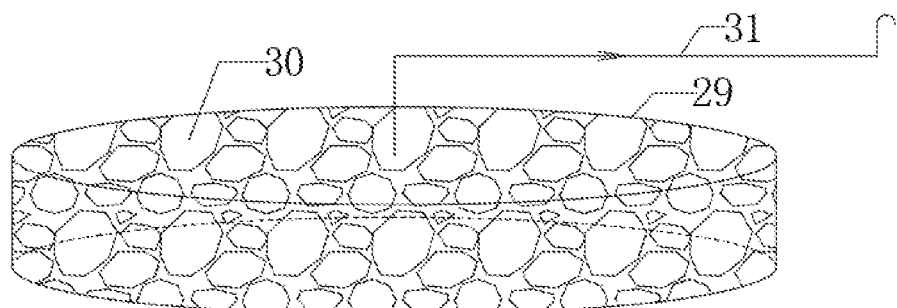
FIG. 4 is a structural diagram of a deodorization module of the system shown in FIG. 1.

As shown in FIGS. 1 to 4, a system for extracting carbon source from sewage sludge in sewer pipes through online organic and inorganic component separation includes outer system box 33 and a system body provided in the outer system box. The system body is cylindrical, and includes deodorization module 29, pre-treatment module 1, and cyclone separation module 18 that are sequentially connected from top to bottom. An upper side wall of the cyclone separation module 18 is provided with oversize residue pressing module 14. The pre-treatment module 1, the cyclone separation module 18, and the oversize residue pressing module 14 are electrically connected to control module 32.

The pre-treatment module 1 is configured to screen out large particles in sewage sludge. A main body of the pre-treatment module is 30-40 cm high, and includes grid plate 2, rotating scraper 3, rinsing device 4, variable-frequency drive motor 6, sludge distribution pipe 7, oversize residue inlet slot 8, flow adjustment sludge funnel 11, sludge discharge valve 12, and first sludge outlet pipe 13.

The grid plate 2 is a fixed, horizontal circular grid plate, provided with evenly distributed circular holes with a diameter of 2-3 mm. The sludge distribution pipe 7 is provided with 3 to 4 evenly spaced sludge outlets above the grid plate 2. A bottom of the rotating scraper 3 is tangent to an upper surface of the grid plate 2. The rotating scraper 3 is driven by the variable-frequency drive motor 6 to distribute the sewage sludge discharged from the sludge distribution pipe 7 on a surface of the grid plate 2.

The rinsing device 4 is mainly configured for intermittent rinsing of the large particle intercepted on the surface of the grid plate 2 and for cleaning after a system operation. The rinsing device 4 is fixedly connected to the rotating scraper 3, and is provided with an inlet end connected to water inlet system 9 through hose 10. The hose 10 is provided with a steel wire lining.

The oversize residue inlet slot 8 is provided opposite to the sludge distribution pipe 7, and close to an edge of the grid plate 2, easy for the rotating scraper 3 to scrape the large particle intercepted by the grid plate 2 into the oversize residue inlet slot.

The flow adjustment sludge funnel 11 is located below the grid plate 2, and is configured to collect sludge passing through the grid plate 2 and adjust a sludge flow rate. The collected sludge enters the cyclone separation module 18 through the first sludge outlet pipe 13.

The cyclone separation module 18 is configured to perform organic and inorganic component separation and carbon source extraction of the sewage sludge under a high-speed cyclone state. The cyclone separation module is 75-80 cm high, and includes variable-frequency stirring motor 21, adjustable stirring paddle 22, sludge inlet pipe 20, dosing system 19, separation funnel 23, second sludge outlet pipe 26, discharge valve 24, inorganic component discharge pipe 25, emptying pipe 27, and emptying valve 28.

The variable-frequency stirring motor 21 is configured to drive the adjustable stirring paddle 22 to rotate. A speed of the variable-frequency stirring motor is adjusted according to the separation effect of the organic and inorganic components in the sludge. The adjustable stirring paddle 22 is provided in a middle-upper part of the cyclone separation module 18. The mounting height, stirring speed, and type of the adjustable stirring paddle 22 are adjusted based on the separation effect of the inorganic component.

The sludge inlet pipe 20 is provided vertically and opposite to the second sludge outlet pipe 26. The sludge inlet pipe 20 includes an inlet end connected to the dosing system 19 and the first sludge outlet pipe 13 through a tee, and an outlet end provided 15-20 cm below an operating liquid level of the cyclone separation module. The dosing system 19 is configured to add an agent including a calcium hydroxide solution for intensified removal and resource utilization of phosphate in the sludge at a phosphate concentration of not less than 10 mg/L.

The separation funnel 23 is located at a bottom of the cyclone separation module 18, and is configured to collect an inorganic component separated from the sewage sludge. A lower end of the separation funnel 23 is provided with the discharge valve 24 and the inorganic component discharge pipe 25.

The emptying pipe 27 is provided in a middle part of the cyclone separation module 18, and is configured to empty the sewage sludge in a main body of the cyclone separation module 18 after the system operation.

The oversize residue pressing module 14 is configured to dewater and press the oversize residue separated by the grid plate 2, and includes drive motor 15, a pressing tank, and discharge spout 16. The pressing tank is connected to the oversize residue inlet slot 8 through vertical channel 17. The discharge spout 16 is provided diagonally upwards at 45°, and extends out of a side of the outer system box 33.

The deodorization module 29 is a 15-20 cm high cylindrical structure, and is provided with an air inlet mesh at a bottom surface. The deodorization module adopts unpowered deodorization. The deodorization module is configured for physical adsorption of malodorous gas emitted during sludge treatment, and includes filler 30 and air evacuation device 31. The filler 30 includes granular activated carbon. The air evacuation device 31 includes one end connected to a top center of the deodorization module 29 and the other end extending out of the side of the outer system box 33.

The rotating scraper 3 has a height of 4 cm and a length equivalent to a radius of the grid plate 2. The rotating scraper is made of a hard material, namely 304 stainless steel, and an elastic rubber material. The elastic rubber material is provided at a lower part of a free end of the rotating scraper 3. The elastic rubber material has a length that is ⅓ of the length of the rotating scraper 3, and a height that is ½ of a height of the rotating scraper 3. A remaining main body of the rotating scraper is made of the hard material.

The rinsing device 4 is provided with rinsing nozzle 5 every 10-20 cm. The rinsing nozzle 5 is provided diagonally downwards at 45° from a vertical direction. The rinsing nozzle 5 is located above the rotating scraper 3.

The oversize residue inlet slot 8 has a length that is ⅓ of the radius of the grid plate 2, a width of 100-120 mm, and a height of 120-150 mm. A top of the oversize residue inlet slot is 2 cm higher than the upper surface of the grid plate 2 to prevent the sewage sludge from entering.

A bottom of the outer system box 33 is provided with caster 34, allowing the flexible movement of the system at an online sludge separation site of a sewer pipe network 40.

A sludge inlet of the sludge distribution pipe 7 is connected to pressure sludge outlet pipe 37. The pressure sludge outlet pipe 37 is connected to suction pump 36 of sewer pipe network sludge cleaning vehicle 35. The suction pump 36 is connected to a bottom of a blocked sewage inspection well 39 at a tail end of a dredging section of the sewer pipe network 40 through suction pipe 38.

The second sludge outlet pipe 26 of the cyclone separation module 18 is connected to sewage inspection well 42 of a nearby sewer pipe network 40 through sludge discharge pipe 41.

The separation funnel 23 of the cyclone separation module 18 is made of 10-12 cm thick organic glass, easy for observing an actual volume of the inorganic component in the form of fine sand and ultra-fine sand separated during the sludge treatment. An outer wall of the system body and the outer system box 33 are made of a stainless steel material, and the system body has a diameter of 60-80 cm.

The control module 32 is located on a front side of the outer system box 33, and is electrically connected, through a circuit, with the variable-frequency drive motor 6 of the pre-treatment module 1, the drive motor 15 of the oversize residue pressing module 14, and the variable-frequency stirring motor 21, the discharge valve 24, and the emptying valve 28 of the cyclone separation module 18. The emptying valve 28 is provided on the emptying pipe 27. The control module 32A is powered by a public power distribution cabinet close to the dredging section of the sewer pipe network 40 or an on-board diesel generator at a dredging site.

The deodorization module 29, the pre-treatment module 1, and the cyclone separation module 18 are connected for easy maintenance of the variable-frequency drive motor 6, the variable-frequency stirring motor 21, and the drive motor 15, and for easy adjustment of the mounting height of the adjustable stirring paddle 22.

A method for extracting carbon source from sewage sludge in sewer pipes through online organic and inorganic component separation, uses the system for extracting carbon source from sewage sludge in sewer pipes through online organic and inorganic component separation, and includes the following steps.

a. The suction pump 36 of the sewer pipe network sludge cleaning vehicle 35 pumps the sewage sludge in the sewer pipe network 40 into the sludge distribution pipe 7 of the pre-treatment module 1 through the suction pipe 38 and the pressure sludge outlet pipe 37. Under the continuous pushing of the rotating scraper 3, the sewage sludge discharged from the sludge distribution pipe 7 is distributed on the upper surface of the grid plate 2. Most of the sewage sludge quickly passes through the circular holes, with an inner diameter of 2-3 mm, of the grid plate 2 due to gravity and enters the flow adjustment sludge funnel 11 below the grid plate 2. The large particle is intercepted on the upper surface of the grid plate 2. The rinsing nozzle 5 of the rinsing device 4, which runs intermittently every 5-10 min, sprays a high-pressure water flow for rinsing the large particle. Then the oversize residue enters from the square oversize residue inlet slot 8 with a width of 100-120 mm into the pressing tank of the oversize residue pressing module 14 through the vertical channel 17 for dewatering and pressing. The oversize residue discharged from the discharge spout 16 is collected by a dedicated collection bucket as household waste, and is transported to a nearby garbage transfer station.

b. The sewage sludge treated by the pre-treatment module 1 in Step a flows through the first sludge outlet pipe 13, and enters vertically into the main body of the cyclone separation module 18 through the sludge inlet pipe 20, along with the agent added by the dosing system 19. Under the high-speed rotation of the adjustable stirring paddle 22 driven by the variable-frequency stirring motor 21, the sludge is subjected to a hydrocyclone separation with a hydraulic retention time of 1-3 min. In this way, an organic component, that is, an organic carbon source, wrapped and adsorbed on surfaces of a fine sand and other substance in the sludge, is separated into a liquid phase, a low-density sludge mixture dominated by an organic component enters the middle-upper part of the cyclone separation module 18, and an inorganic inert component including a fine sand and some ultra-fine sand in the sludge enters a bottom part of the separation funnel 23 under a combined action of a centrifugal force and gravity. Specifically, whether to operate the dosing system 19 depends on an actual phosphate concentration in the sewage sludge (whether it is not less than 10 mg/L) and a phosphorus resource utilization need.

Preferably, the dosing system 19 is configured to add an agent including a calcium hydroxide solution for intensified removal and resource utilization of phosphate in the sludge at a phosphate concentration of not less than 10 mg/L. If the phosphate concentration is not less than 10 mg/L, the dosing system operates. If the phosphate concentration is less than 10 mg/L, the dosing system does not operate.

c. The sewage sludge treated by the cyclone separation module 18 in Step b is discharged into the sewage inspection well 42 of the nearby sewer pipe network 40 through the second sludge outlet pipe 26 and the sludge discharge pipe 41. An outlet of sludge discharge pipe 41 is located below a water level of the sewage inspection well 42 to avoid ineffective loss of the carbon source extracted from the sewage sludge due to waterfall aeration. According to an actual volume, the inorganic inert component separated in Step b is intermittently discharged into a dedicated collection bucket through the inorganic component discharge pipe 25 under the control of the emptying valve 28 and the discharge valve 24, and is transported to a nearby urban sewage treatment plant for further sand-water separation and precipitation separation of phosphorus-containing chemical sludge.

d. The malodorous gas such as hydrogen sulfide emitted during the treatment in Steps a and b naturally enters the deodorization module 29 provided in an upper part of the system. The malodorous gas is subjected to physical adsorption treatment of the filler 30, and is discharged from the air evacuation device 31 connected to the top center of the cylindrical deodorization module 29.

The volatile suspended solids/suspended solids (VSS/SS) ratio and the chemical oxygen demand/total nitrogen (COD/TN) ratio of the sewage sludge treated by the cyclone separation module 18 are not less than 0.5 and 15, respectively, indicating that the sewage sludge is able to be utilized as a supplementary carbon source for an urban sewage treatment plant with a high emission standard at the tail end of the sewer pipe network 40. The VSS/SS ratio of the inorganic inert component such as fine sand separated by the cyclone separation module 18 is less than 3%, indicating that the inorganic inert component is able to be utilized as an engineering construction material. Therefore, the present disclosure achieves the purpose of resource utilization.

It should be understood that, in the description of the present disclosure, terms such as "upper", "lower", "left", and "right" indicate orientation or position relationships based on the accompanying drawings. Unless otherwise specified, these terms are merely intended to facilitate or simplify the description of the present disclosure, rather than to indicate or imply that the mentioned device or components must have a specific orientation and must be constructed and operated in a specific orientation. Therefore, they should not be construed as a limitation to the protection scope of the present disclosure.

To make the objectives, technical solutions, and advantages of the present disclosure clearer, the present invention is further described below in detail with reference to the drawings and embodiments. It should be understood that the specific examples described herein are only intended to explain the present disclosure, but not to limit the present disclosure.

Embodiment 1

A method for extracting carbon source from sewage sludge in sewer pipes through online organic and inorganic component separation, uses the system for extracting carbon source from sewage sludge in sewer pipes through online organic and inorganic component separation, and includes the following steps.

a. The suction pump 36 of the sewer pipe network sludge cleaning vehicle 35 pumps the sewage sludge in the sewer pipe into the sludge distribution pipe 7 of the pre-treatment module 1 through the suction pipe 38 and the pressure sludge outlet pipe 37. Under the continuous pushing of the rotating scraper 3 with a height of 4 cm, the sewage sludge discharged from the sludge distribution pipe 7 is distributed on the upper surface of the grid plate 2. Most of the sewage sludge quickly passes through the circular holes, with an inner diameter of 3 mm, of the horizontally provided circular grid plate 2 due to gravity and enters the flow adjustment sludge funnel 11 below the grid plate 2. The large particle is intercepted on the upper surface of the grid plate 2. The rinsing nozzle 5 of the rinsing device 4, which runs intermittently every 10 min, sprays a high-pressure water flow for rinsing the large particle. Then the large particle enters from the square oversize residue inlet slot 8 with a width of 100 mm into the oversize residue pressing module 14 through the vertical channel 17 for dewatering and pressing. The oversize residue discharged from the discharge spout 16 is collected by a dedicated collection bucket as household waste, and is transported to a nearby garbage transfer station.

b. The sewage sludge treated by the pre-treatment module 1 flows through the first sludge outlet pipe 13, and enters vertically into the cyclone separation module 18 through the sludge inlet pipe 20, along with the agent added by the dosing system 19. Under the high-speed rotation of the adjustable stirring paddle 22 driven by the variable-frequency stirring motor 21, the sludge is subjected to a hydrocyclone separation with a hydraulic retention time of 1 min. In this way, an organic component, that is, an organic carbon source, wrapped and adsorbed on surfaces of a fine sand and other substance in the sludge, is separated into a liquid phase, a low-density sludge mixture dominated by an organic component enters the middle-upper part of the cyclone separation module 18, and an inorganic inert component including a fine sand and some ultra-fine sand in the sludge enters the separation funnel 23 under a combined action of a centrifugal force and gravity. Specifically, whether to operate the dosing system 19 depends on an actual phosphate concentration in the sewage sludge (whether it is not less than 10 mg/L) and a phosphorus resource utilization need.

c. The sewage sludge treated by the cyclone separation module 18 in Step b is discharged into the sewage inspection well 42 of the nearby sewer pipe network 40 through the second sludge outlet pipe 26 and the sludge discharge pipe 41. An outlet of sludge discharge pipe 41 is located below a water level of the sewage inspection well 42 to avoid ineffective loss of the carbon source extracted from the sewage sludge due to waterfall aeration. According to an actual volume, the inorganic inert component such as fine sand separated in Step b is intermittently discharged into a dedicated collection bucket through the inorganic component discharge pipe 25 under the control of the emptying valve 28 and the discharge valve 24, and is transported to a nearby urban sewage treatment plant for further sand-water separation and precipitation separation of phosphorus-containing chemical sludge.

d. The malodorous gas such as hydrogen sulfide emitted during the treatment in Steps a and b naturally enters the deodorization module 29 provided in an upper part of the system. The malodorous gas is subjected to physical adsorption treatment of the filler 30 made of activated carbon, and is discharged from the air evacuation device 31 located at the top center of the cylindrical deodorization module 29.

The VSS/SS ratio and COD/TN ratio of the sewage sludge treated by the cyclone separation module 18 are 0.6 and 20, respectively, indicating that the sewage sludge is able to be utilized as a supplementary carbon source for an urban sewage treatment plant with a high emission standard at the tail end of the sewer pipe network 40. The VSS/SS ratio of the inorganic inert component such as fine sand separated by the cyclone separation module 18 is 2.5%, indicating that the inorganic inert component is able to be utilized as an engineering construction material. Therefore, the present disclosure achieves the purpose of resource utilization.

Embodiment 2

A method for extracting carbon source from sewage sludge in sewer pipes through online organic and inorganic component separation includes the following steps.

a. The suction pump 36 of the sewer pipe network sludge cleaning vehicle 35 pumps the sewage sludge in the sewer pipe network 40 into the sludge distribution pipe 7 of the pre-treatment module 1 through the suction pipe 38 and the pressure sludge outlet pipe 37. Under the continuous pushing of the rotating scraper 3 with a height of 4 cm, the sewage sludge discharged from the sludge distribution pipe 7 is distributed on the upper surface of the fixed circular grid plate 2. Most of the sewage sludge quickly passes through the circular holes, with an inner diameter of 2 mm, of the horizontally provided circular grid plate 2 due to gravity and enters the flow adjustment sludge funnel 11 below the grid plate 2. The large particle is intercepted on the upper surface of the grid plate 2. The rinsing nozzle 5 of the rinsing device 4, which runs intermittently every 5 min, sprays a high-pressure water flow for rinsing the large particle. Then the large particle enters from the square oversize residue inlet slot 8 with a width of 120 mm into the oversize residue pressing module 14 through the vertical channel 17 for dewatering and pressing. The oversize residue discharged from the discharge spout 16 is collected by a dedicated collection bucket as household waste, and is transported to a nearby garbage transfer station.

b. The sewage sludge treated by the pre-treatment module 1 flows through the first sludge outlet pipe 13, and enters vertically into the cyclone separation module 18 through the sludge inlet pipe 20, along with the agent added by the dosing system 19. Under the high-speed rotation of the adjustable stirring paddle 22 driven by the variable-frequency stirring motor 21, the sludge is subjected to a hydrocyclone separation with a hydraulic retention time of 3 min. In this way, an organic component, that is, an organic carbon source, wrapped and adsorbed on surfaces of a fine sand and other substance in the sludge, is separated into a liquid phase, a low-density sludge mixture dominated by an organic component enters the middle-upper part of the cyclone separation module 18, and an inorganic inert component including a fine sand and some ultra-fine sand in the sludge enters the separation funnel 23 under a combined action of a centrifugal force and gravity. Specifically, whether to operate the dosing system 19 depends on an actual phosphate concentration in the sewage sludge (whether it is not less than 10 mg/L) and a phosphorus resource utilization need.

c. The sewage sludge treated by the cyclone separation module 18 in Step b is discharged into the sewage inspection well 42 of the nearby sewer pipe network 40 through the second sludge outlet pipe 26 and the sludge discharge pipe 41. An outlet of sludge discharge pipe 41 is located below a water level of the sewage inspection well 42 to avoid ineffective loss of the carbon source extracted from the sewage sludge due to waterfall aeration. According to an actual volume, the inorganic inert component such as fine sand separated in Step b is intermittently discharged into a dedicated collection bucket through the inorganic component discharge pipe 25 under the control of the emptying valve 28 and the discharge valve 24, and is transported to a nearby urban sewage treatment plant for further sand-water separation and precipitation separation of phosphorus-containing chemical sludge.

d. The malodorous gas such as hydrogen sulfide emitted during the treatment in Steps a and b naturally enters the deodorization module 29 provided in an upper part of the system. The malodorous gas is subjected to physical adsorption treatment of the filler 30 made of granular activated carbon, and is discharged from the air evacuation device 31 located at the top center of the cylindrical deodorization module 29.

The VSS/SS ratio and COD/TN ratio of the sewage sludge treated by the cyclone separation module 18 are 0.55 and 17.5, respectively, indicating that the sewage sludge is able to be utilized as a supplementary carbon source for an urban sewage treatment plant with a high emission standard at the tail end of the sewer pipe 40 network. The VSS/SS ratio of the inorganic inert component such as fine sand separated by the cyclone separation module 18 is 2%, indicating that the inorganic inert component is able to be utilized as an engineering construction material. Therefore, the present disclosure achieves the purpose of resource utilization.

Embodiment 3

A method for extracting carbon source from sewage sludge in sewer pipes through online organic and inorganic component separation includes the following steps.

a. The suction pump 36 of the sewer pipe network sludge cleaning vehicle 35 pumps the sewage sludge in the sewer pipe network 40 into the sludge distribution pipe 7 of the pre-treatment module 1 through the suction pipe 38 and the pressure sludge outlet pipe 37. Under the continuous pushing of the rotating scraper 3 with a height of 4 cm, the sewage sludge discharged from the sludge distribution pipe 7 is distributed on the upper surface of the fixed circular grid plate 2. Most of the sewage sludge quickly passes through the circular holes, with an inner diameter of 2.5 mm, of the horizontally provided circular grid plate 2 due to gravity and enters the flow adjustment sludge funnel 11 below the grid plate 2. The large particle is intercepted on the upper surface of the grid plate 2. The rinsing nozzle 5 of the rinsing device 4, which runs intermittently every 10 min, sprays a high-pressure water flow for rinsing the large particle. Then the large particle enters from the square oversize residue inlet slot 8 with a width of 100 mm into the oversize residue pressing module 14 through the vertical channel 17 for dewatering and pressing. The oversize residue discharged from the discharge spout 16 is collected by a dedicated collection bucket as household waste, and is transported to a nearby garbage transfer station.

b. The sludge pre-treated in Step a flows through the first sludge outlet pipe 13, and enters vertically into the cyclone separation module 18 through the sludge inlet pipe 20, along with the agent added by the dosing system 19. Under the high-speed rotation of the adjustable stirring paddle 22 driven by the variable-frequency stirring motor 21, the sludge is subjected to a hydrocyclone separation with a hydraulic retention time of 2 min. In this way, an organic component, that is, an organic carbon source, wrapped and adsorbed on surfaces of a fine sand and other substance in the sludge, is separated into a liquid phase, a low-density sludge mixture dominated by an organic component enters the middle-upper part of the cyclone separation module 18, and an inorganic inert component including a fine sand and some ultra-fine sand in the sludge enters the bottom separation funnel 23 under a combined action of a centrifugal force and gravity. Specifically, whether to operate the dosing system 19 depends on an actual phosphate concentration in the sewage sludge (whether it is not less than 10 mg/L) and a phosphorus resource utilization need.

c. The sewage sludge treated by the cyclone separation module 18 in Step b is discharged into the sewage inspection well 42 of the nearby sewer pipe network 40 through the second sludge outlet pipe 26 and the sludge discharge pipe 41. An outlet of sludge discharge pipe 41 is located below a water level of the sewage inspection well 42 to avoid ineffective loss of the carbon source extracted from the sewage sludge due to waterfall aeration. According to an actual volume, the inorganic inert component such as fine sand separated in Step b is intermittently discharged into a dedicated collection bucket through the inorganic component discharge pipe 25 under the control of the emptying valve 28 and the discharge valve 24, and is transported to a nearby urban sewage treatment plant for further sand-water separation and precipitation separation of phosphorus-containing chemical sludge.

d. The malodorous gas such as hydrogen sulfide emitted during the treatment in Steps a and b naturally enters the deodorization module 29 provided in an upper part of the system. The malodorous gas is subjected to physical adsorption treatment of the filler 30 made of granular activated carbon, and is discharged from the air evacuation device 31 located at the top center of the cylindrical deodorization module 29.

The VSS/SS ratio and COD/TN ratio of the sewage sludge treated by the cyclone separation module 18 are 0.5 and 15, respectively, indicating that the sewage sludge is able to be utilized as a supplementary carbon source for an urban sewage treatment plant with a high emission standard at the tail end of the sewer pipe network 40. The VSS/SS ratio of the inorganic inert component such as fine sand separated by the cyclone separation module 18 is 1.5%, indicating that the inorganic inert component is able to be utilized as an engineering construction material. Therefore, the present disclosure achieves the purpose of resource utilization.

It should be noted that the above embodiments are only intended to explain, rather than to limit the technical solutions of the present disclosure. Although the present disclosure is described in detail with reference to examples, those skilled in the art should understand that modifications or equivalent substitutions may be made to the technical solutions of the present disclosure without departing from the spirit and scope of the technical solutions of the present disclosure, and such modifications or equivalent substitutions should be included within the scope of the claims of the present disclosure.

What is claimed is:

1. A system for extracting carbon source from sewage sludge in sewer pipes through online organic and inorganic component separation, comprising an outer system box, wherein a system body is provided in the outer system box; the system body comprises a deodorization module, a pre-treatment module, and a cyclone separation module that are sequentially connected from top to bottom; an upper side wall of the cyclone separation module is provided with an oversize residue pressing module; and the pre-treatment module, the cyclone separation module, and the oversize residue pressing module are electrically connected to a control module;

the pre-treatment module is configured to screen out a large particle in sewage sludge, and comprises a grid plate, a rotating scraper, a rinsing device, a variable-frequency drive motor, a sludge distribution pipe, an oversize residue inlet slot, a flow adjustment sludge funnel, a sludge discharge valve, and a first sludge outlet pipe;

the grid plate is a fixed horizontal circular grid plate;

the sludge distribution pipe is provided with a sludge outlet; and the sludge outlet is located above the grid plate;

a bottom of the rotating scraper is tangent to an upper surface of the grid plate; and the rotating scraper is driven by the variable-frequency drive motor to distribute the sewage sludge discharged from the sludge distribution pipe on a surface of the grid plate;

the rinsing device is mainly configured for intermittent rinsing of the large particle intercepted on the surface of the grid plate and for cleaning after a system operation; and the rinsing device is fixedly connected to the rotating scraper, and is provided with an inlet end connected to a water inlet system through a hose;

the oversize residue inlet slot is provided opposite to the sludge distribution pipe, and close to an edge of the grid plate, so that the rotating scraper is easy to scrape the large particle intercepted by the grid plate into the oversize residue inlet slot;

the flow adjustment sludge funnel is located below the grid plate, and is configured to collect sludge passing through the grid plate and adjust a sludge flow rate; and the collected sludge enters the cyclone separation module;

the cyclone separation module is configured to perform organic and inorganic component separation and carbon source extraction of the sewage sludge under a high-speed cyclone state, and comprises a variable-frequency stirring motor, an adjustable stirring paddle, a sludge inlet pipe, a dosing system, a separation funnel, a second sludge outlet pipe, a discharge valve, an inorganic component discharge pipe, an emptying pipe, and an emptying valve;

the variable-frequency stirring motor is configured to drive the adjustable stirring paddle to rotate; and the adjustable stirring paddle is provided in a middle-upper part of the cyclone separation module;

the sludge inlet pipe is provided vertically and opposite to the second sludge outlet pipe;

and the sludge inlet pipe comprises an inlet end connected to the dosing system and the first sludge outlet pipe through a tee, and an outlet end provided 15-20 cm below an operating liquid level of the cyclone separation module;

the separation funnel is located at a bottom of the cyclone separation module, and is configured to collect an inorganic component separated from the sewage sludge; and a lower end of the separation funnel is provided with the discharge valve and the inorganic component discharge pipe;

the emptying pipe is provided in a middle part of the cyclone separation module, and is configured to empty the sewage sludge in a main body of the cyclone separation module after the system operation;

the oversize residue pressing module is configured to dewater and press an oversize residue separated by the grid plate, and comprises a drive motor, a pressing tank, and a discharge spout; the pressing tank is connected to the oversize residue inlet slot through a vertical channel; and the discharge spout is provided diagonally upwards, and extends out of a side of the outer system box; and the deodorization module is configured for physical adsorption of malodorous gas emitted during sludge treatment by unpowered deodorization, and comprises a filler and an air evacuation device; a bottom surface of the deodorization module is provided with an air inlet mesh; the filler comprises granular activated carbon; and the air evacuation device comprises one end connected to a top center of the deodorization module and the other end extending out of the side of the outer system box.

2. The system for extracting carbon source from sewage sludge in sewer pipes through online organic and inorganic component separation according to claim 1, wherein the rotating scraper has a height of 4 cm and a length equivalent to a radius of the grid plate;

the rotating scraper is made of a hard material and an elastic rubber material; the elastic rubber material is provided at a lower part of a free end of the rotating scraper; and the elastic rubber material has a length ⅓ of the length of the rotating scraper, and a height ½ of a height of the rotating scraper.

3. The system for extracting carbon source from sewage sludge in sewer pipes through online organic and inorganic component separation according to claim 1, wherein the rinsing device is provided with a rinsing nozzle every 10-20 cm; the rinsing nozzle is provided diagonally downwards at 45° from a vertical direction; and the rinsing nozzle is located above the rotating scraper; and the oversize residue inlet slot has a length ⅓ of the radius of the grid plate, a width of 100-120 mm, and a height of 120-150 mm; and a top of the oversize residue inlet slot is 2 cm higher than the upper surface of the grid plate to prevent the sewage sludge from entering.

4. The system for extracting carbon source from sewage sludge in sewer pipes through online organic and inorganic component separation according to claim 1, wherein a bottom of the outer system box is provided with a caster, allowing flexible movement of the system at an online sludge separation site of a sewer pipe network.

5. The system for extracting carbon source from sewage sludge in sewer pipes through online organic and inorganic component separation according to claim 1, wherein a sludge inlet of the sludge distribution pipe is connected to a pressure sludge outlet pipe;
the pressure sludge outlet pipe is connected to a suction pump of a sewer pipe network sludge cleaning vehicle; and the suction pump is connected to a bottom of a blocked sewage inspection well at a tail end of a dredging section of a sewer pipe network through a suction pipe.

6. The system for extracting carbon source from sewage sludge in sewer pipes through online organic and inorganic component separation according to claim 1, wherein the second sludge outlet pipe of the cyclone separation module is connected to a sewage inspection well of a nearby sewer pipe through a sludge discharge pipe.

7. The system for extracting carbon source from sewage sludge in sewer pipes through online organic and inorganic component separation according to claim 1, wherein the separation funnel of the cyclone separation module is made of 10-12 cm thick organic glass, so that an actual volume of the inorganic component in the form of fine sand and ultra-fine sand separated is easily observed during the sludge treatment; an outer wall of the system body and the outer system box are made of a stainless steel material; and the system body has a diameter of 60-80 cm.

8. The system for extracting carbon source from sewage sludge in sewer pipes through online organic and inorganic component separation according to claim 1, wherein the control module is located on a front side of the outer system box, and is electrically connected to the variable-frequency drive motor of the pre-treatment module, the variable-frequency stirring motor of the cyclone separation module, the discharge valve, the emptying valve on the emptying pipe, and the drive motor of the oversize residue pressing module through a circuit; and the control module is powered by a public power distribution cabinet close to a dredging section of a sewer pipe network or an on-board diesel generator at a dredging site.

9. A method for extracting carbon source from sewage sludge in sewer pipes through online organic and inorganic component separation, using the system for extracting carbon source from sewage sludge in sewer pipes through online organic and inorganic component separation according to claim 1, and comprising the following steps:
a: pumping, by a suction pump of a sewer pipe network sludge cleaning vehicle, sewage sludge in a sewer pipe network into the sludge distribution pipe of the pre-treatment module through a suction pipe and a pressure sludge outlet pipe; distributing, by the rotating scraper under continuous rotation, the sewage sludge discharged from the sludge distribution pipe on the upper surface of the grid plate, such that most of the sewage sludge quickly passes through circular holes of the grid plate due to gravity and enters the conical flow adjustment sludge funnel below the grid plate, while the large particle in the sewage sludge is intercepted on the upper surface of the grid plate; rinsing the large particle through a high-pressure water flow sprayed by a rinsing nozzle of the intermittently running rinsing device; allowing the rinsed large particle to enter from the oversize residue inlet slot into the pressing tank of the oversize residue pressing module through the vertical channel for dewatering and pressing; and collecting, by a dedicated collection bucket, an oversize residue discharged from the discharge spout as household waste, and transporting the oversize residue to a nearby garbage transfer station;
b: allowing the sewage sludge pre-treated by the pre-treatment module in step a to flow through the first sludge outlet pipe, and enter vertically into the main body of the cyclone separation module through the sludge inlet pipe, along with an agent added by the dosing system; subjecting, by the adjustable stirring paddle under high-speed rotation driven by the variable-frequency stirring motor, the sewage sludge to a hydrocyclone separation with a hydraulic retention time of 1-3 min, such that an organic carbon source in the sewage sludge is separated into a liquid phase, a low-density sludge mixture dominated by an organic component enters the middle-upper part of the cyclone separation module, and an inorganic inert component in the sewage sludge enters the separation funnel under a combined action of a centrifugal force and gravity; and determining whether to operate the dosing system based on an actual phosphate concentration in the sewage sludge and a phosphorus resource utilization need;
c: discharging the sewage sludge treated by the cyclone separation module in step b into a sewage inspection well of a nearby sewer pipe network through the second sludge outlet pipe and a sludge discharge pipe, and locating an outlet of sludge discharge pipe below a water level of the sewage inspection well; and intermittently discharging, according to an actual volume, the inorganic inert component separated in step b into a dedicated collection bucket through the inorganic component discharge pipe under the control of the emptying valve and the discharge valve, and transporting the inorganic inert component to a nearby urban sewage treatment plant for further sand-water separation and precipitation separation of phosphorus-containing chemical sludge; and
d: allowing the malodorous gas emitted during the treatment in steps a and b to naturally enter the deodorization module provided in an upper part of the system; subjecting the malodorous gas to physical adsorption treatment of the filler; and discharging the malodorous gas from the air evacuation device connected to the top center of the cylindrical deodorization module.

10. The method for extracting carbon source from sewage sludge in sewer pipes through online organic and inorganic component separation according to claim 9, wherein a volatile suspended solids/suspended solids ratio and a chemical oxygen demand/total nitrogen ratio of the sewage sludge treated by the cyclone separation module are not less than 0.5 and 15, respectively, indicating that the sewage sludge is able to be utilized as a supplementary carbon source for an urban sewage treatment plant with a high emission standard at the tail end of the sewer pipe network; and a VSS/SS ratio of the inorganic inert component separated by the cyclone separation module is less than 3%, indicating that the inorganic inert component is able to be utilized as an engineering construction material.

* * * * *